(12) United States Patent
Murata et al.

(10) Patent No.: US 11,364,763 B2
(45) Date of Patent: Jun. 21, 2022

(54) STABILIZER CONTROL APPARATUS

(71) Applicant: TOYOTA JIDOSHA KABUSHIKI KAISHA, Toyota (JP)

(72) Inventors: Kazuyuki Murata, Toyota (JP);
Masaaki Tabata, Nagoya (JP);
Masashi Yamamoto, Chiryu (JP);
Ikuhide Iyoda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/326,578

(22) Filed: May 21, 2021

(65) Prior Publication Data
US 2022/0001715 A1 Jan. 6, 2022

(30) Foreign Application Priority Data

Jul. 2, 2020 (JP) .............................. JP2020-114679

(51) Int. Cl.
*B60G 21/02* (2006.01)

(52) U.S. Cl.
CPC ........ *B60G 21/026* (2013.01); *B60G 2204/82* (2013.01); *B60G 2204/8306* (2013.01);
(Continued)

(58) Field of Classification Search
CPC . B60W 10/22; B60G 21/026; B60G 2204/82; B60G 2204/8306;
(Continued)

(56) References Cited

U.S. PATENT DOCUMENTS 4,616,848 A * 10/1986 Sugasawa .......... B60G 17/0165
180/41
4,770,438 A * 9/1988 Sugasawa ........ B60G 17/01941
188/266.7
(Continued)

FOREIGN PATENT DOCUMENTS

DE  102019213266 A1 * 3/2021 ......... B60G 17/0162
JP  2005-088722 A     4/2005
(Continued)

OTHER PUBLICATIONS

KR-100987071-B1 English Translation and Original Doc retrieved from Espacenet on Nov. 29, 2021 (Year: 2010).*

*Primary Examiner* — Paul N Dickson
*Assistant Examiner* — Caitlin Anne Miller
(74) *Attorney, Agent, or Firm* — Sughrue Mion, PLLC

(57) ABSTRACT

The ECU of the stabilizer control apparatus determines, based on a high frequency component of a wheel acceleration and a low frequency component of a wheel speed difference, whether a road surface state is a rough road state or a smooth road state. When the road surface state is determined to be the rough road state, the ECU sets a turning determination threshold to a rough road threshold. When the road surface state is determined to be the smooth road state, the ECU sets the threshold to a smooth road threshold. When a turning determination parameter is greater than the threshold, the ECU sets each of first, second, and third cylinders to a lock state to increase rigidity of stabilizers. When the turning determination parameter is smaller than the turning determination threshold, the ECU sets each of the cylinders to a free state to decrease the rigidity of the stabilizers.

4 Claims, 9 Drawing Sheets

(52) U.S. Cl.
CPC .... *B60G 2400/102* (2013.01); *B60G 2400/20* (2013.01); *B60G 2400/821* (2013.01)

(58) Field of Classification Search
CPC .......... B60G 2400/102; B60G 2400/20; B60G 2400/208; B60G 2400/82; B60G 2400/821; B60G 17/0165; B60G 2400/204; B60G 17/0162; B60Y 2400/3032
See application file for complete search history.

(56) References Cited

U.S. PATENT DOCUMENTS

| | | | | |
|---|---|---|---|---|
| 4,796,911 | A * | 1/1989 | Kuroki | B60G 21/0558 280/5.511 |
| 4,827,416 | A * | 5/1989 | Kawagoe | B60G 17/016 280/5.512 |
| 5,487,006 | A * | 1/1996 | Kakizaki | B60G 17/0165 280/5.507 |
| 6,385,525 | B2 * | 5/2002 | Watanabe | B60G 17/0165 701/80 |
| 2009/0020966 | A1 | 1/2009 | Germain | |
| 2010/0207343 | A1 * | 8/2010 | Sano | B60G 17/0162 280/124.106 |
| 2011/0208391 | A1 * | 8/2011 | Mizuta | B60G 17/0165 701/37 |
| 2012/0221228 | A1 * | 8/2012 | Noumura | B60W 30/02 701/1 |
| 2014/0343815 | A1 * | 11/2014 | Takeuchi | B60T 7/12 701/70 |
| 2016/0200164 | A1 | 7/2016 | Tabata et al. | |
| 2017/0182859 | A1 * | 6/2017 | Anderson | B60G 13/14 |
| 2018/0345979 | A1 * | 12/2018 | Abdossalami | B60G 17/0195 |
| 2019/0039429 | A1 | 2/2019 | Fujii et al. | |
| 2020/0114721 | A1 | 4/2020 | Tanzan et al. | |
| 2020/0180386 | A1 | 6/2020 | Tabata et al. | |

FOREIGN PATENT DOCUMENTS

| | | | | |
|---|---|---|---|---|
| JP | 2009-023650 | A | | 2/2009 |
| JP | 2016-130044 | A | | 7/2016 |
| JP | 2018-188101 | A | | 11/2018 |
| JP | 2020-059477 | A | | 4/2020 |
| JP | 2020-093619 | A | | 6/2020 |
| JP | 2021078165 | A * | 5/2021 | ............. B60L 15/20 |
| KR | 100987071 | B1 * | 10/2010 | |
| KR | 100987076 | B1 * | 10/2010 | |

* cited by examiner

STABILIZER CONTROL APPARATUS

TECHNICAL FIELD

The present disclosure relates to a stabilizer control apparatus configured to control torsional rigidity (hereinafter, simply referred to as a "rigidity") of a stabilizer.

BACKGROUND

A conventionally known stabilizer control apparatus (hereinafter, referred to as a "conventional apparatus") is configured to determine whether or not a vehicle is turning based on a decision criterion/condition, and to make the rigidity of the stabilizer higher when it is determined that the vehicle is turning than when it is determined that the vehicle is not turning (e.g., refer to Japanese Patent Application Laid-Open (kokai) No. 2016-130044). Therefore, the conventional apparatus can let the stabilizer function/work effectively while the vehicle is turning so as to decrease a roll angle and improve (steering) stability of the vehicle.

In addition, when it is determined that the vehicle is not turning (in other words, when the vehicle is running straight), the conventional apparatus can let the stabilizer substantially stop functioning.

Therefore, the conventional apparatus can allow wheels of the vehicle to stroke greatly, and thus, can allow great vertical movement of the wheels with respect to a vehicle body. Consequently, the conventional apparatus can improve a ride quality/comfortableness of the vehicle.

SUMMARY

In the conventional apparatus, if the turning decision criterion/condition is set at one that is relatively easy to be satisfied so as to determine that the vehicle is turning in order to improve the stability of the vehicle, the turning decision criterion/condition may be sometimes satisfied by input force from a road surface while the vehicle is running straight on a rough road. If this happens, the conventional apparatus erroneously determines that the vehicle is turning and increases the rigidity of the stabilizer so as not to allow the great wheel stroke (vertical movement). Consequently, the conventional apparatus may degrade the ride quality/comfortableness of the vehicle while the vehicle is running straight.

In contrast, the turning decision criterion/condition may be set at one that is relatively hard to be satisfied in order to prevent the above degradation of the ride quality/comfortableness, however, in this case, the turning decision criterion/condition does not become satisfied at the beginning of turning while the vehicle is turning on a smooth road. In other words, at the beginning of turning, the conventional apparatus may determine that the vehicle is not turning, and therefore, may decrease the rigidity of the stabilizer. This prohibits the stabilizer from functioning at the beginning of turning. Consequently, the conventional apparatus may degrade the stability of the vehicle while the vehicle is running on the smooth road.

The present disclosure is made to cope with the above-described problems. One of the objectives of the present disclosure is to provide a stabilizer control apparatus that is capable of decreasing a possibility of the degradation of the ride quality/comfortableness of the vehicle while the vehicle is running straight on the rough road, and of improving the stability of the vehicle while the vehicle is running on the smooth road. Hereinafter, the stabilizer control apparatus according to the present disclosure may be referred to as a "present disclosed stabilizer control apparatus".

The present disclosed stabilizer control apparatus is applied to a vehicle (10) having a stabilizer (21).

The present disclosed stabilizer control apparatus comprises:

a first sensor (52) generating a first signal that varies depending on a roughness state of a road surface on which the vehicle is running;

a second sensor (53) generating a second signal that varies depending on a degree of turning of the vehicle;

a variable rigidity device (20) configured to vary a torsional rigidity of the stabilizer; and a control unit (50) configured to:

obtain a turning determination parameter indicative of a degree of turning of the vehicle based on the second signal;

compare the turning determination parameter with a turning determination threshold (step 515);

let the variable rigidity device set the torsional rigidity of the stabilizer at a first rigidity (step 525), when the turning determination parameter is greater than the turning determination threshold (step 515: Yes); and let the variable rigidity device set the torsional rigidity of the stabilizer at a second rigidity lower than the first rigidity (step 530), when the turning determination parameter is equal to or smaller than the turning determination threshold (step 515: No).

The control unit is configured to:

obtain a parameter for road surface state determination that varies depending on the roughness state of the road surface based on the first signal (step 315, step 415); and vary the turning determination threshold in such a manner that the turning determination threshold becomes greater as a degree of roughness of the road surface determined based on the parameter for road surface state determination becomes higher (step 510, step 520).

According to the present disclosed stabilizer control apparatus, in a case where a degree indicative of the roughness of the road surface on which the vehicle is running is high, it becomes harder that the vehicle is determined to be turning when the vehicle is actually running straight. Therefore, when the vehicle is actually running straight, the rigidity of the stabilizer is hard to be high. In addition, according to the present disclosed stabilizer control apparatus, in a case where the degree indicative of the roughness of the road surface is low, it becomes easier that the vehicle is determined to be turning. Therefore, the rigidity of the stabilizer is made high at the beginning of turning while the vehicle is turning. Consequently, the present disclosed stabilizer control apparatus can prevent the degradation of the ride quality/comfortableness of the vehicle while the vehicle is running straight on the rough road, and can improve the (steering) stability of the vehicle while the vehicle is running (and turning) on the smooth road.

In some embodiment, the control unit is configured to classify, based on the parameter for road surface state determination, the degree of roughness of the road surface into a first stage (e.g., a smooth road state) and a second stage (e.g., a rough road state) whose degree of roughness of the road surface is higher than that of the first stage (step 325, step 430, step 505).

According to the above-described embodiment, the turning determination threshold is set to a value appropriate/suitable for each of the first stage and the second stage (i.e., states indicative of the roughness of the road surface). Thus, the above-described embodiment can prevent the degradation of the ride quality/comfortableness of the vehicle while the vehicle is running straight on the rough road that corresponds to the second stage, and can improve the (steering) stability of the vehicle while the vehicle is running on the smooth road that corresponds to the first stage.

In some embodiment, the control unit is configured to classify, based on the parameter for road surface state determination, the degree of roughness of the road surface into three or more stages, each corresponding to a different degree of roughness state of the road surface (step 625, step 635, step 645, step 650).

According to the above-described embodiment, the turning determination threshold is set to a value appropriate/suitable for each of the three or more of the stages regarding the roughness of the road surface. Thus, the above-described embodiment can decrease a possibility that it is erroneously determined that the vehicle is turning while the vehicle is actually running straight, and can determine that the vehicle starts turning at an earlier timing as the degree of the roughness state of the road surface is smaller. Consequently, the above-described embodiment can realize improving the good ride quality/comfortableness of the vehicle while the vehicle is running on the rough road as well as improving the stability of the vehicle while the vehicle is turning, at a high level.

In some embodiment, the control unit is configured to obtain, as the parameter for road surface state determination, a first parameter for road surface state determination that varies depending on the roughness state of the road surface and a second parameter for road surface state determination that varies depending on the roughness state of the road surface, based on the first signal (step 305 to step 315, and step 405 to step 415).

The above-described embodiment can determine/specify the roughness state of the road surface more accurately, using the first parameter for road surface state determination and the second parameter for road surface state determination. Therefore, the above-described embodiment can set the turning determination threshold to a value more suitable for the stages regarding the roughness of the road surface, based on the more accurate determination result of the roughness state of the road surface.

In some embodiment, the control unit is configured to calculate a high frequency component of a wheel acceleration of a wheel of the vehicle as the first parameter for road surface state determination, and a low frequency component of a wheel speed difference between a left wheel speed and a right wheel speed as the second parameter for road surface state determination (step 305 to step 315, and step 405 to step 415).

In some embodiment, the control unit is configured to calculate a high frequency component of a vertical acceleration of a vehicle body of the vehicle as the first parameter for road surface state determination, and a low frequency component of the vertical acceleration of the vehicle body as the second parameter for road surface state determination (step 805 and step 810, and, step 905 and step 910).

The above-described embodiments can make a road surface determination while utilizing a high frequency component of a certain parameter caused by a concavity and a convexity of the road surface and a low frequency component a certain parameter caused by the concavity and the convexity of the road surface. Therefore, the above-described embodiments can set the turning determination threshold to a value more suitable for the stages regarding the roughness of the road surface, based on the more accurate determination result of the roughness state of the road surface.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols.

DETAILED DESCRIPTION

First Embodiment

<Configuration>

Figure 1A:
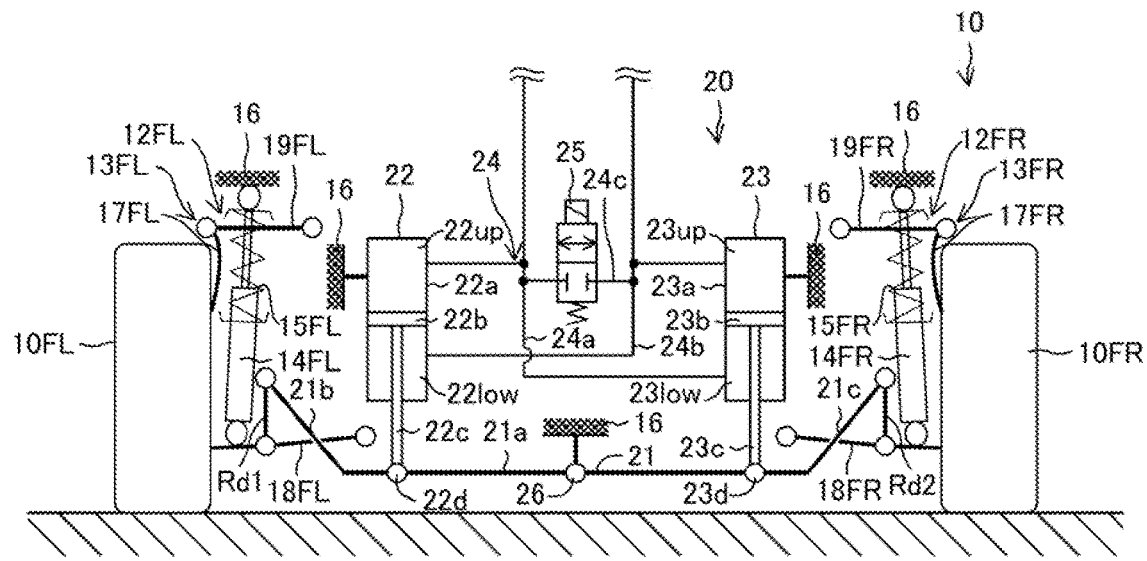
FIG. 1A is a schematic diagram of a control device of a stabilizer for front wheels.

A stabilizer control apparatus (hereinafter, referred to as a "first apparatus") according to a first embodiment of the present disclosure is applied to a four-wheel vehicle (four-wheel automobile). As shown in FIG. 1A, a front left wheel 10FL and a front right wheel 10FR of the vehicle 10 are supported by (suspended from) a vehicle body 16 through a suspension apparatus 12FL and a suspension apparatus 12FR, respectively. Each of the suspension apparatuses 12FL and 12FR is an independent suspension. The suspension apparatus 12FL includes a suspension link mechanism 13FL, a shock absorber 14FL, and a suspension spring 15FL. The suspension apparatus 12FR includes a suspension link mechanism 13FR, a shock absorber 14FR, and a suspension spring 15FR.

The front left wheel 10FL is connected to the vehicle body 16 through the suspension link mechanism 13FL. The suspension link mechanism 13FL includes a knuckle 17FL, a lower arm 18FL, and an upper arm 19FL. The knuckle 17FL rotatably supports the front left wheel 10FL. The lower arm 18FL and the upper arm 19FL swingably connect the knuckle 17FL to the vehicle body 16.

The shock absorber 14FL is disposed between the vehicle body 16 and the lower arm 18FL. An upper end of the shock absorber 14FL is connected to the vehicle body 16. A lower end of the shock absorber 14FL is connected to the lower arm 18FL. The suspension spring 15FL is elastically disposed between the vehicle body 16 and the lower arm 18FL through the shock absorber 14FL. More specifically, an upper end of the suspension spring 15FL is connected to the vehicle body 16. A lower end of the suspension spring 15FL is connected to a cylinder of the shock absorber 14FL.

The front left wheel 10FR is connected to the vehicle body 16 through the suspension link mechanism 13FR. The suspension link mechanism 13FR includes a knuckle 17FR, a lower arm 18FR, and an upper arm 19FR. The knuckle 17FR rotatably supports the front right wheel 10FR. The lower arm 18FR and the upper arm 19FR swingably connect the knuckle 17FR to the vehicle body 16.

The shock absorber 14FR is disposed between the vehicle body 16 and the lower arm 18FR. An upper end of the shock absorber 14FR is connected to the vehicle body 16. A lower end of the shock absorber 14FR is connected to the lower arm 18FR. The suspension spring 15FR is elastically disposed between the vehicle body 16 and the lower arm 18FR through the shock absorber 14FR. More specifically, an upper end of the suspension spring 15FR is connected to the vehicle body 16. A lower end of the suspension spring 15FR is connected to a cylinder of the shock absorber 14FR.

The first apparatus comprises a variable rigidity (control) device 20 of a front-wheel stabilizer. The variable rigidity device 20 includes a first stabilizer 21, a first cylinder 22, a second cylinder 23, a pipe section 24, and a first electromagnetic valve 25. It should be noted an example of the configuration of the variable rigidity device 20 is disclosed in detail in, for example, Japanese Patent Application Laid-Open (kokai) No. 2020-93619, that is hereby incorporated by reference.

The first stabilizer 21 comprises a torsion section (part) 21a, a left arm section (part) 21b, and a right arm section (part) 21c. The torsion section 21a extends in a vehicle width direction. The left arm section 21b is connected to a left end of the torsion section 21a. The right arm section 21c is connected to a right end of the torsion section 21a. The left arm section 21b is connected to the lower arm 18FL through a link rod Rd1. The right arm section 21c is connected to the lower arm 18FR through a link rod Rd2. The torsion section 21a is rotatably supported by the vehicle body 16 through a first support member 26 fixed to the vehicle body 16.

The first cylinder 22 is a hydraulic cylinder, and includes a cylinder housing 22a, a piston 22b, and a piston rod 22c. The cylinder housing 22a is fixed to the vehicle body 16 through an unillustrated bush. The piston 22b separates (an inside of) the cylinder housing 22a into a first upper chamber 22up and a first lower chamber 22low. An upper end of the piston rod 22c is connected to the piston 22b. A lower end part of the piston rod 22c extends downward from a lower end of the cylinder housing 22a. A lower end of the piston rod 22c is connected to the torsion section 21a at a part close to the left end of the torsion section 21a through a second support member 22d. By means of this, the lower end of the piston rod 22c rotatably supports the first stabilizer 21. It should be noted that the first cylinder 22 and the pipe section 24 are filled with unillustrated working fluid.

The second cylinder 23 is a hydraulic cylinder, and includes a cylinder housing 23a, a piston 23b, and a piston rod 23c. The cylinder housing 23a is fixed to the vehicle body 16 through an unillustrated bush. The piston 23b separates (an inside of) the cylinder housing 23a into a second upper chamber 23up and a second lower chamber 23low. An upper end of the piston rod 23c is connected to the piston 23b. A lower end part of the piston rod 23c extends downward from a lower end of the cylinder housing 23a. A lower end of the piston rod 23c is connected to the torsion section 21a at a part close to the right end of the torsion section 21a through a third support member 23d. By means of this, the lower end of the piston rod 23c rotatably supports the first stabilizer 21. It should be noted that the second cylinder 23 and the pipe section 24 are filled with the unillustrated working fluid.

The pipe section 24 includes a first pipe 24a, a second pipe 24b, and a third pipe 24c. The first pipe 24a connects (communicates) the first upper chamber 22up with the second lower chamber 23low. The second pipe 24b connects (communicates) the first lower chamber 22low with the second upper chamber 23up. The third pipe 24c connects (communicates) the first pipe 24a with the second pipe 24b.

The first electromagnetic valve 25 is disposed in the third pipe 24c. The first electromagnetic valve 25 is a normally-closed electromagnetic open-close valve (on off valve). When the first electromagnetic valve 25 is not energized (i.e., when the first electromagnetic valve 25 is in a non-energized state), the first electromagnetic valve 25 is set at a shutting down state (closed state) where a flow of the working fluid in the third pipe 24 is shut off. Whereas, when the first electromagnetic valve 25 is energized (i.e., when the first electromagnetic valve 25 is in an energized state), the first electromagnetic valve 25 is set at an opened state where the flow of the working fluid in the third pipe 24 is allowed.

Figure 1B:
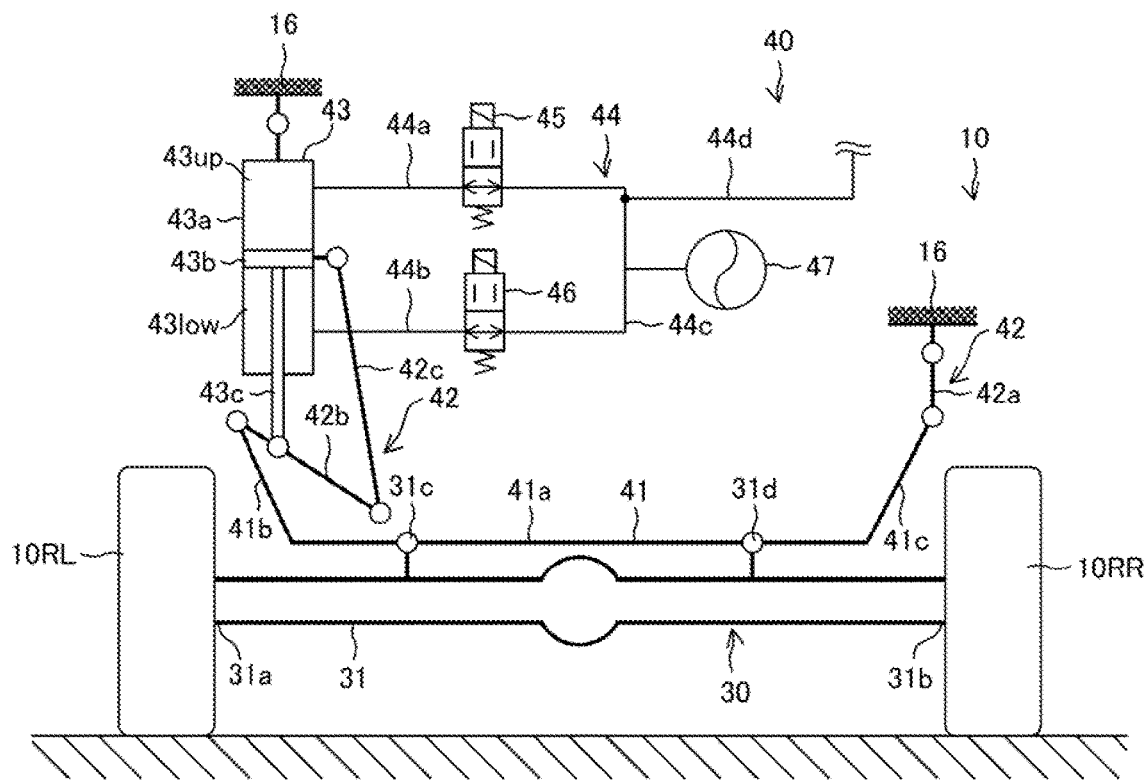
FIG. 1B is a schematic diagram of a control device of a stabilizer for rear wheels.

As shown in FIG. 1B, a rear left wheel 10RL and a rear right wheel 10RR of the vehicle 10 are supported by (suspended from) the vehicle body 16 through a suspension apparatus 30 that is an axle suspension. The suspension apparatus 30 comprises a single axle shaft 31 and unillustrated right and left support members. A left end 31a of the axle shaft 31 is connected to the rear left wheel 10RL, and a right end 31b of the axle shaft 31 is connected to the rear right wheel 10RR. Each of the right and left support members include a suspension spring and a shock absorber. The axle shaft 31 is swingably supported to the vehicle body 16 through the right and left support members.

The first apparatus comprises a variable rigidity device 40 of a rear-wheel stabilizer. The variable rigidity device 40 includes a second stabilizer 41, a link mechanism 42, a third cylinder 43, a pipe section 44, a second electromagnetic valve 45, a third electromagnetic valve 46, and an accumulator 47. The third cylinder 43, the pipe section 44, and a liquid chamber of the accumulator 47 are filled with working fluid. It should be noted an example of the configuration of the variable rigidity device 40 is also disclosed in detail in, for example, Japanese Patent Application Laid-Open (kokai) No. 2020-93619, that is hereby incorporated by reference.

The second stabilizer 41 includes a torsion section 41a, a left arm section 41b, and a right arm section 41c. The torsion section 41a extends in the vehicle width direction. The left arm section 41b is connected to a left end of the torsion section 41a. The right arm section 41c is connected to a right end of the torsion section 41a. The second stabilizer 41 is rotatably supported by the axle shaft 31 through "a fourth support member 31c and a fifth support member 31d" connected to the axle shaft 31.

The link mechanism 42 includes a first link rod 42a, a second link rod 42b, and a third link rod 42c. The first link rod 42a connects an end of the right arm section 41c with the vehicle body 16. The right arm section 41c is connected to the vehicle body 16 through the first link rod 42a. One end of the second link rod 42b is connected to an end of the left arm section 41b. The other end of the second link rod 42b is connected to an end of the third link rod 42c. The other end of the third link rod 42c is connected to the third cylinder. More specifically, the left arm section 41b is connected to the vehicle body 16, through the second link rod 42b, the third link rod 42c, and the third cylinder 43.

The third cylinder 43 is a hydraulic cylinder, and includes a cylinder housing 43a, a piston 43b, and a piston rod 43c. The cylinder housing 43a is fixed to the vehicle body 16 through an unillustrated bush. The piston 43b separates (an inside of) the cylinder housing 43a into a third upper chamber 43up and a third lower chamber 43low. An upper end of the piston rod 43c is connected to the piston 43b. A lower end part of the piston rod 43c extends downward from a lower end of the cylinder housing 43a. A lower end of the piston rod 43c is connected to the second link rod 42b. By means of this, the lower end of the piston rod 43c supports the second stabilizer 41 through the second link rod 42b.

The pipe section 44 includes a fourth pipe 44a, a fifth pipe 44b, a sixth pipe 44c, and a seventh pipe 44d. One end of the fourth pipe 44a is connected to the third upper chamber 43up. One end of the fifth pipe 44b is connected to the third lower chamber 43low. One end of the sixth pipe 44c is connected to the other end of the fourth pipe 44a, and the other end of the sixth pipe 44c is connected to the other end of the fifth pipe 44b. Consequently, the fourth pipe 44a, the fifth pipe 44b, and the sixth pipe 44c connects (communicates) the third upper chamber 43up with the third lower chamber 43low.

The second electromagnetic valve 45 is disposed in the fourth pipe 44a. The second electromagnetic valve 45 is a normally-opened electromagnetic open-close valve (on off valve). When the second electromagnetic valve 45 is in the non-energized state, the second electromagnetic valve 45 is set at an opened state where the flow of the working fluid in the fourth pipe 44a is allowed. Whereas, when the second electromagnetic valve 45 is in the energized state, the second electromagnetic valve 45 is set at a closed state (shutting down state) where a flow of the working fluid in the fourth pipe 44a is shut off.

The third electromagnetic valve 46 is disposed in the fifth pipe 44b. The third electromagnetic valve 46 is a normally-opened electromagnetic open-close valve (on off valve). When the third electromagnetic valve 46 is in the non-energized state, the third electromagnetic valve 46 is set at an opened state where the flow of the working fluid in the fifth pipe 44b is allowed. Whereas, when the third electromagnetic valve 46 is in the energized state, the third electromagnetic valve 46 is set at a closed state (shutting down state) where a flow of the working fluid in the fifth pipe 44b is shut off.

The accumulator 47 has a function to absorb variation in pressure of the working fluid. The accumulator 47 is separated into a liquid chamber and a gas chamber by a diaphragm. Nitrogen gas is enclosed within the gas chamber. The liquid chamber is connected to the sixth pipe 44c. The seventh pipe 44d is connected to the sixth pipe 44c.

The accumulator 47 is connected to an unillustrated valve mechanism through the sixth pipe 44c and the seventh pipe 44d. In addition, "the first pipe 24a and the second pipe 24b" shown in FIG. 1A are also connected to the unillustrated valve mechanism. This unillustrated valve mechanism allows the working fluid to flow into and/or flow out from each of the first pipe 24a, the second pipe 24b, and the seventh pipe 44d, when a volume of the working fluid varies due to a change in temperature.

Figure 2:
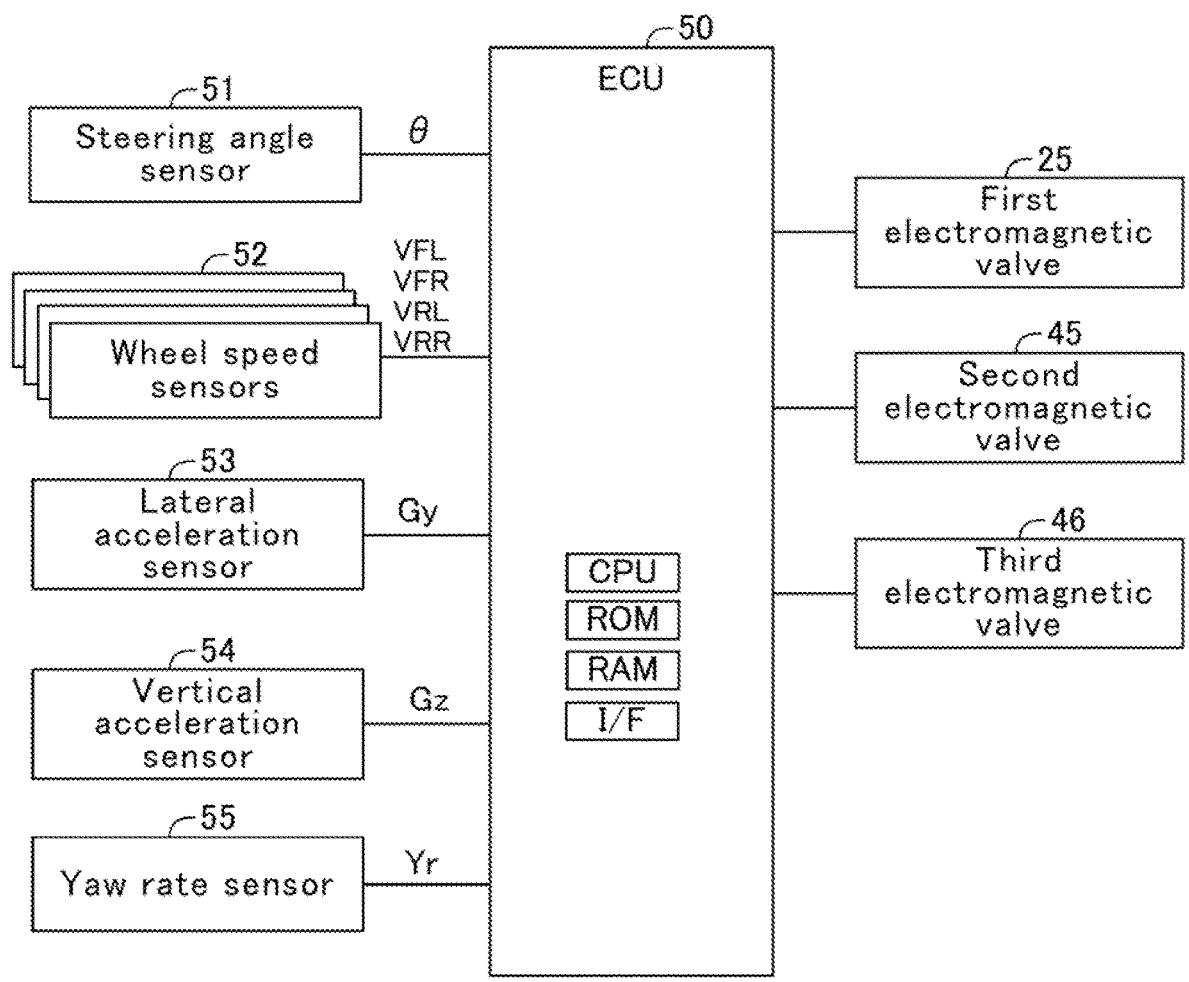
FIG. 2 is a block diagram of a stabilizer control apparatus.

As shown in FIG. 2, the first apparatus further comprises an ECU 50, a steering angle sensor 51, a plurality of wheel speed sensors 52, a lateral acceleration sensor 53, a vertical acceleration sensor 54, and a yaw rate sensor 55.

The ECU 50 is a control unit (Electronic Control Unit) that includes, as a main component, a microcomputer, and is referred to as a controller. The microcomputer includes a CPU, a ROM, a RAM, and an interface (I/F). The CPU achieves various functions through executing instructions (i.e., programs/routines) stored in the ROM. It should be noted that the ECU 50 may be implemented by a plurality of ECUs.

The ECU 50 is connected with the first electromagnetic valve 25, the second electromagnetic valve 45, and the third electromagnetic valve 46. The ECU 50 changes energizing states of each of these electromagnetic valves so as to set each of the electromagnetic valves at either the opened state or the closed state. The ECU 50 substantially changes the rigidity/stiffness (torsional rigidity) of the first stabilizer 21 by setting the state of the first electromagnetic valve 25 to one of the opened state and the closed state. In addition, the ECU 50 substantially changes the rigidity/stiffness (torsional rigidity) of the second stabilizer 41 by setting the state of each of the second electromagnetic valve 45 and the third electromagnetic valve 46 to one of the opened state and the closed state.

More specifically, when the ECU 50 sets the first electromagnetic valve 25 to the closed state, a communication between the first pipe 24a and the second pipe 24b is shut down. This stops (prohibits, restricts) flowing of the working fluid between the first upper chamber 22up and the second lower chamber 23low through the first pipe 24a, and also stops (prohibits, restricts) flowing of the working fluid between the first lower chamber 22low and the second upper chamber 23up through the second pipe 24b. Consequently, neither the first cylinder 22 nor the second cylinder 23 works (extension/contraction of each of the cylinders 22 and 23 is prohibited), and thus, the first stabilizer 21 is fixed to the vehicle body 16 through the first cylinder 22 and the second cylinder 23 so that the first stabilizer 21 does not swing. This substantially increases the rigidity of the first stabilizer 21, and the first stabilizer 21 can function as the stabilizer. That is, when the front right wheel 10FR and the front left wheel 10FL displace in opposite direction to each other, the torsion section 21a is twisted. Thus, the first stabilizer 21 generates a force (spring reaction force) that decreases a roll angle of the vehicle body 16. Consequently, since the roll angle can be decreased, the stability of the vehicle 10 can be improved.

Whereas, when the ECU 50 sets the first electromagnetic valve 25 to the opened state, the first pipe 24a and the second pipe 24b are communicated with each other. This allows flowing of the working fluid among the first upper chamber 22up, the first lower chamber 22low, the second upper chamber 23up, and the second lower chamber 23low. Therefore, when one of the first cylinder 22 and the second cylinder 23 is about to extend/lengthen, the other one of them can shrink/shorten. In contrast, when one of the first cylinder 22 and the second cylinder 23 is about to shrink/shorten, the other one of them can extend/lengthen. Consequently, the first stabilizer can swing with respect to the vehicle body 16 through the first support member 26, in response to the extension and contraction of the first cylinder 22 and the second cylinder 23. Therefore, the first stabilizer 21 is hardly twisted. In other words, the rigidity of the first stabilizer 21 is substantially decreased so that the first stabilizer 21 does not function as the stabilizer.

For example, in a case where the first electromagnetic valve 25 is set to the opened state, when the front left wheel 10FL and the front right wheel 10FR displace in opposite direction to each other, one of the first cylinder 22 and the second cylinder 23 extends/lengthens and the other one of them shrinks/shortens. Therefore, the torsion section 21a is hard to be twisted, and the first stabilizer 21 hardly generates the force (spring reaction force) that decreases the roll angle of the vehicle body 16. Whereas, in this case, since the front wheels are allowed to displace greatly, the ride quality/comfortableness of the vehicle 10 is improved.

When the ECU 50 sets each of the second electromagnetic valve 45 and the third electromagnetic valve 46 to the closed state, a communication between the third upper chamber 43up and the third lower chamber 43low is shut down. This stops (prohibits, restricts) flowing of the working fluid between the third upper chamber 43up and the third lower chamber 43low through the fourth pipe 44a, the fifth pipe 44b, and the sixth pipe 44c. Consequently, since the third cylinder 43 does not work (can neither extend/lengthen nor shrink/shorten), the second stabilizer 41 is fixed to the vehicle body 16 through the third cylinder 43 in such a manner that the second stabilizer 41 cannot swing with respect to the vehicle body 16. This substantially increases the rigidity of the second stabilizer 41, and the second stabilizer 41 can function as the stabilizer. Consequently, since the roll angle can be decreased by the second stabilizer 41, the stability of the vehicle 10 can be improved.

Whereas, when the ECU 50 sets each of the second electromagnetic valve 45 and the third electromagnetic valve 46 to the opened state, the third upper chamber 43up and the third lower chamber 43low are communicated with each other. This allows flowing of the working fluid between the third upper chamber 43up and the third lower chamber 43low, and thus, the third cylinder 43 is allowed to extend/lengthen and shrink/shorten. Therefore, the rigidity of the second stabilizer 41 is substantially decreased so that the second stabilizer 41 does not function as the stabilizer. In this case, since the rear wheels are allowed to displace greatly, the ride quality/comfortableness of the vehicle 10 is improved.

It should be noted that, the state where the each of the above-described cylinders is prohibited from extending and shrinking is referred to as a "lock state". The state where the each of the above-described cylinders is allowed to extend and shrink is referred to as a "free state".

The ECU 50 is connected to the steering angle sensor 51, a plurality of the wheel speed sensors 52, the lateral acceleration sensor 53, the vertical acceleration sensor 54, and the yaw rate sensor 55, and receives signals generated by these sensors.

The steering angle sensor 51 is configured to detect a steering angle of the vehicle 10 so as to output/generate a signal indicative of the steering angle θ. A plurality of the wheel speed sensors 52 are disposed at respective positions corresponding to four wheels 10FL-10RR. Each of the wheel speed sensors 52 generates one pulse signal every time the corresponding wheel rotates by a predetermined constant angle. The ECU 50 counts the number of the pulse signals sent from each of a plurality of the wheel speed sensors 52 for a predetermined time (sampling time) every time the predetermined time elapses, and obtains each of rotational speed (i.e., a front left wheel speed VFL, a front right wheel speed VFR, a rear left wheel speed VRL, and a rear right wheel speed VRR) of the corresponding wheel based on the counted number of the pulse signals for the corresponding wheel. The ECU 50 stores, in the RAM, each of the wheel rotational speeds (referred to as a wheel speed) that is obtained in a predetermined last period from "a time point a predetermined time length before a present time point" to the present time point.

The lateral acceleration sensor 53 is configured to detect a lateral acceleration (acceleration in the vehicle width direction) of the vehicle 10 so as to output/generate a signal indicative of the lateral acceleration Gy.

The vertical acceleration sensor 54 is configured to detect a vertical acceleration (acceleration in the vertical direction) of the vehicle body 16 so as to output/generate a signal indicative of the vertical acceleration Gz of the vehicle body 16. The ECU 50 obtains the vertical acceleration Gz using the vertical acceleration sensor 54 every time the sampling time elapses. The ECU 50 stores, in the RAM, the vertical acceleration Gz obtained in the predetermined last period.

The yaw rate sensor 55 is configured to detect a yaw rate of the vehicle 10 so as to output/generate a signal indicative of the yaw rate Yr.

It should be noted that "the wheel speed sensors 52 and/or the vertical acceleration sensor 54" may be categorized as a "first sensor", and "the steering angle sensor 51 and/or the lateral acceleration sensor 53" may be categorized as a "second sensor".

<Outline of Operation>

The first apparatus determines whether or not the vehicle 10 is turning by comparing a turning determination parameter with a turning determination threshold. The turning determination parameter is a parameter indicative of a degree of turning of the vehicle 10. More specifically, the first apparatus determines whether or not the vehicle 10 is turning by determining whether or not "a magnitude (an absolute value) |Gy| of the lateral acceleration Gy of the vehicle 10" that is one of the turning determination parameters is equal to or greater than a turning determination threshold Gyth that is one of the turning determination thresholds. The first apparatus determines that the vehicle 10 is turning when it is determined that the magnitude |Gy| of the lateral acceleration Gy is equal to or greater than the turning determination threshold Gyth. The first apparatus determines that the vehicle 10 is not turning when it is determined that the magnitude |Gy| of the lateral acceleration Gy is smaller than the turning determination threshold Gyth.

It should be noted that the first apparatus may determine whether or not the vehicle 10 is turning using, in place of the magnitude |Gy| of the lateral acceleration Gy, another turning determination parameter (e.g., a magnitude of the steering angle θ, a magnitude |dθ/dt| of a rate of the steering angle θ while the magnitude |dθ/dt| is increasing, and a magnitude |Yr| of the yaw rate Yr). In this case as well, the first apparatus determines whether or not the vehicle 10 is turning by comparing each of the turning determination parameters with a turning determination threshold corresponding to each of the turning determination parameters. It can be said that the turning determination parameter is a parameter that becomes greater as the magnitude |Gy| of the lateral acceleration Gy of the vehicle 10 or the magnitude |Yr| of the yaw rate Yr of the vehicle 10 becomes greater.

When the first apparatus determines that the vehicle 10 is turning, the first apparatus sets each of the first cylinder 22, the second cylinder 23, and the third cylinder 43 to the lock state. By means of this, the first apparatus substantially increases the rigidity of the first stabilizer 21 and the rigidity of the second stabilizer 41.

Whereas, when the first apparatus determines that the vehicle 10 is not turning, the first apparatus sets each of the first cylinder 22, the second cylinder 23, and the third cylinder 43 to the free state. By means of this, the first apparatus substantially decreases the rigidity of the first stabilizer 21 and the rigidity of the second stabilizer 41.

Meanwhile, if the turning determination threshold Gyth is kept constant, it is difficult to improve the ride quality/comfortableness of the vehicle 10 on the rough road as well as the stability of the vehicle 10 on the smooth road while the vehicle 10 is turning, for the reasons described below.

For example, when the vehicle 10 is running straight on the rough road, the vehicle 10 may sometimes vibrate in the vehicle width direction (or in the lateral direction) by a force (road surface input force) that is input/add to the vehicle 10 from the road surface due to the concavity and the convexity of the road surface. In this case, if the turning determination threshold Gyth has been set at a value whose absolute value is relatively small (i.e., the value that easily causes the first apparatus to determine that the vehicle 10 is turning), the magnitude |Gy| of the lateral acceleration Gy may become larger than the turning determination threshold Gyth, so that the first apparatus may erroneously determine that the vehicle 10 is turning. Consequently, even when the vehicle is running straight, the rigidity of the first stabilizer 21 and the rigidity of the second stabilizer 41 is increased so that the wheels are not allowed to displace greatly, and thus, the ride quality/comfortableness of the vehicle 10 may be degraded.

To the contrary, if the turning determination threshold Gyth has been set at a value whose absolute value is relatively large (i.e., the value that easily causes the first apparatus to determine that the vehicle 10 is not turning), when the vehicle starts turning on the smooth road, it is hard to determine that the vehicle 10 is turning at the beginning of turning. Therefore, at the beginning of turning, the rigidity of the first stabilizer 21 and the rigidity of the second stabilizer 41 are kept low, and thus, the first stabilizer 21 and the second stabilizer 41 cannot properly function as the stabilizers. Consequently, the roll angle of the vehicle body 16 may become large, and the stability of the vehicle 10 may be degraded.

In view of the above, the first apparatus determines whether a state of the road surface on which the vehicle 10 is running (sometimes, the state is referred to as a roughness state of the road surface) is a rough road state or a smooth road state. Hereinafter, such a determination as to the roughness state of the road surface may sometimes be referred to as a "road surface determination". It can be said that the smooth road state is a state where the roughness state of the road surface (or a degree indicative of roughness of the road surface) is a first level, and the rough road state is a state where the roughness state of the road surface is a second level that is greater than the first level.

The first apparatus sets the turning determination threshold Gyth to/at a rough road threshold Bth when the first apparatus determines that the state of the road surface is the rough road state. Namely, the first apparatus sets the turning determination threshold Gyth to the value that is hard to cause the first apparatus to determine that the vehicle 10 is turning. By this means, the rigidity of the first stabilizer 21 and the rigidity of the second stabilizer 41 are hard to be increased while the vehicle 10 is running straight on the rough road, and thus, the ride quality/comfortableness of the vehicle 10 can be improved.

The first apparatus sets the turning determination threshold Gyth to/at a smooth road threshold Gth when the first apparatus determines that the state of the road surface is the smooth road state. Namely, the first apparatus sets the turning determination threshold Gyth to the value that is easy to cause the first apparatus to determine that the vehicle 10 is turning. By this means, the rigidity of the first stabilizer 21 and the rigidity of the second stabilizer 41 are relatively easy to be increased (to function as the stabilizers) while the vehicle 10 is running on the smooth road from the beginning of turning, and thus, the stability of the vehicle 10 can be improved.

<Specific Operation>

The CPU (hereinafter, simply referred to as the "CPU") of the ECU 50 executes each of routines shown by flowcharts of FIG. 3 to FIG. 5, every time a predetermined time elapses.

Therefore, when an appropriate time comes, the CPU starts processing from step 300 shown in FIG. 3, and executes processes of step 305 to step 315, described below. Thereafter, CPU proceeds to step 320.

Step 305: the CPU reads out time series data of "the front left wheel speed VFL and the front right wheel speed VFR" within the predetermined last period, from the RAM. Thereafter, the CPU calculates an average of "the front left wheel speed VFL and the front right wheel speed VFR" at each time point within the predetermined last period as a wheel speed (or a front-wheel speed) Vw at each time point. In this manner, the CPU obtains time series data of the wheel speed Vw within the predetermined last period.

Step 310: the CPU differentiates each of the time series data of the wheel speed Vw with respect to time so as to obtain time series data of wheel acceleration Gw. For example, the CPU obtains, as the wheel acceleration Gw at a certain time point, a difference between the wheel speed Vw at the certain time point within the time series data of the wheel speed Vw and the wheel speed Vw at a time point the sampling time before the certain time point within the time series data of the wheel speed Vw. The CPU executes this process for each of the time series data of the wheel speed Vw so as to obtain the time series data of the wheel acceleration Gw.

It should be noted that, when the vehicle is being accelerated or is being decelerated owing to operations to an acceleration pedal and a brake pedal, the acceleration/deceleration of the vehicle 10 caused by the operations can be deemed to be substantially constant with respect to an acceleration represented by the wheel acceleration Gw. Therefore, obtaining the time series data of the wheel acceleration Gw allow the acceleration/deceleration of the vehicle 10 caused by the operations to be treated as a DC component. In other words, the wheel acceleration Gw is not adversely affected by the acceleration/deceleration of the vehicle 10 caused by the operations to the pedals, and thus, determination of the state of the road surface using the wheel acceleration Gw is not adversely affected by the acceleration/deceleration of the vehicle 10 caused by the operations to the pedals.

Step 315: the CPU performs a fast-Fourier-transform processing and a band pass filtering processing for the time series data of the wheel acceleration Gw so as to extract a high frequency component(s) of the wheel acceleration Gw from the time series data of the wheel acceleration Gw. The high frequency component of the wheel acceleration Gw is a component of the wheel acceleration Gw within a predetermined high frequency band. Strength/intensity (amplitude) of the high frequency component of the wheel acceleration Gw is greater as the degree indicative of roughness of the road surface is higher. It should be noted that the predetermined high frequency band is preferably a frequency band within which a resonant frequency (in the vicinity of 10 Hz) of an unsprung mass of the vehicle 10 falls. The strength/intensity of the high frequency component of the wheel acceleration Gw may be referred to as a "parameter for road surface state determination" or a "first parameter for road surface state determination", for convenience sake.

When the CPU proceeds to step 320, the CPU determines whether or not the strength/intensity of the high frequency component of the wheel acceleration Gw is greater than a first threshold th1.

When the strength/intensity of the high frequency component of the wheel acceleration Gw is greater than the first threshold th1, the CPU makes a "Yes" determination at step 320 and proceeds to step 325 so as to set a value of a first rough road flag Xd1 to "1". Thereafter, the CPU proceeds to step 395 so as to terminate the present routine tentatively. The first rough road flag Xd1 indicates that the state of the road surface is the rough road state when the value of the first rough road flag Xd1 is "1", and indicates that the state of the road surface is the smooth road state when the value of the first rough road flag Xd1 is "0". The value of the first rough road flag Xd1 is set to "0" through an initialization routine executed by the CPU when an ignition key switch of the vehicle 10 is changed from "Off" to "On".

Whereas, when the strength/intensity of the high frequency component of the wheel acceleration Gw is equal to or smaller than the first threshold th1, the CPU makes a "No" determination at step 320, and proceeds to step 330. At step 330, the CPU sets the value of the first rough road flag Xd1 to "0". Thereafter, the CPU proceeds to step 395 so as to terminate the present routine tentatively.

Meanwhile, when an appropriate time comes, the CPU starts processing from step 400 shown in FIG. 4, and executes processes of step 405 to step 415, described below. Thereafter, CPU proceeds to step 495 so as to terminate the present routine tentatively.

Step 405: the CPU reads out the time series data of "the front left wheel speed VFL and the front right wheel speed VFR" within the predetermined last period, from the RAM, similarly to step 305.

Step 410: the CPU obtains time series data of a wheel speed difference Vwf (that is actually, time series data of an absolute value of a wheel speed difference Vwf) from the time series data read out at step 405. More specifically, the CPU subtract the front right wheel speed VFR at a certain time point from the front left wheel speed VFL at the certain time point so as to obtain a difference speed, and obtains an absolute value of the thus obtained difference speed as the speed difference Vwf at the certain time point. The CPU executes this process for each of the time series data of the front right wheel speed VFR and the time series data of the front left wheel speed VFL so as to obtain the time series data of the wheel speed difference Vwf.

Step 415: the CPU performs a fast-Fourier-transform processing and a band pass filtering processing for the time series data of the wheel speed difference Vwf so as to extract a component(s) of the wheel speed difference Vwf that falls within a predetermined low frequency band. The extracted component(s) may be referred to as a "low frequency component(s) of the wheel speed difference Vwf". The predetermined low frequency band is a band having frequencies lower than frequencies of the above-described predetermined high frequency band, and is preferably a frequency band within which a resonant frequency (in the vicinity of 2 Hz) of a sprung mass of the vehicle 10 falls. The strength/intensity of the low frequency component of the wheel speed difference Vwf may be referred to as the "parameter for road surface state determination" or a "second parameter for road surface state determination", for convenience sake.

At step 420, the CPU determines whether or not a magnitude (an absolute value) |θ| of the steering angle θ is smaller than a steering angle threshold θth. The purpose of this step 420 will be described later.

When the magnitude |θ| of the steering angle θ is smaller than the steering angle threshold θth, the CPU makes a "Yes" determination at step 420 and proceeds to step 425 so as to determine whether or not the strength/intensity of the low frequency component of the wheel speed difference Vwf is greater than a second threshold th2.

When the strength/intensity of the low frequency component of the wheel speed difference Vwf is greater than the second threshold th2, the CPU makes a "Yes" determination at step 425, and proceeds to step 430 so as to set a value of a second rough road flag Xd2 to "1". Thereafter, the CPU proceeds to step 495 so as to terminate the present routine tentatively. The second rough road flag Xd2 indicates that the state of the road surface is the rough road state when the value of the second rough road flag Xd2 is "1", and indicates that the state of the road surface is the smooth road state when the value of the second rough road flag Xd2 is "0". The value of the second rough road flag Xd2 is also set to "0" through the above-described initialization routine.

Whereas, when the strength/intensity of the low frequency component of the wheel speed difference Vwf is equal to or smaller than the second threshold th2, the CPU makes a "No" determination at step 425, and proceeds to step 435. At step 435, the CPU sets the value of the second rough road flag Xd2 to "0". Thereafter, the CPU proceeds to step 495 so as to terminate the present routine tentatively.

When the CPU proceeds to step 420, the CPU makes a "No" determination at step 420 and proceeds to step 495 so as to terminate the present routine tentatively, if the magnitude |θ| of the steering angle θ is equal to or greater than the steering angle threshold θth. In this case, the value of the second rough road flag Xd2 is kept unchanged.

In this manner, when it is determined that the magnitude |θ| of the steering angle θ is equal to or greater than the steering angle threshold θth at step 420, the CPU does not make the determination (at step 425) as to the state of the road surface using the low frequency component of the wheel speed difference Vwf. The reason for this is that a difference (i.e., an inner wheel and an outer wheel speed difference) between a wheel speed of an inner wheel and a wheel speed of an outer wheel is large while the vehicle 10 is turning, and thus, the time series data of the wheel speed difference Vwf may be adversely affected by the difference. In other words, the step 420 is provided to avoid an erroneous determination that the state of the road surface is the rough road state while the vehicle 10 is turning on the smooth road (i.e., while the magnitude |θ| of the steering angle θ is equal to or greater than the steering angle threshold θth) because of the inner wheel and the outer wheel speed difference.

Figure 5:
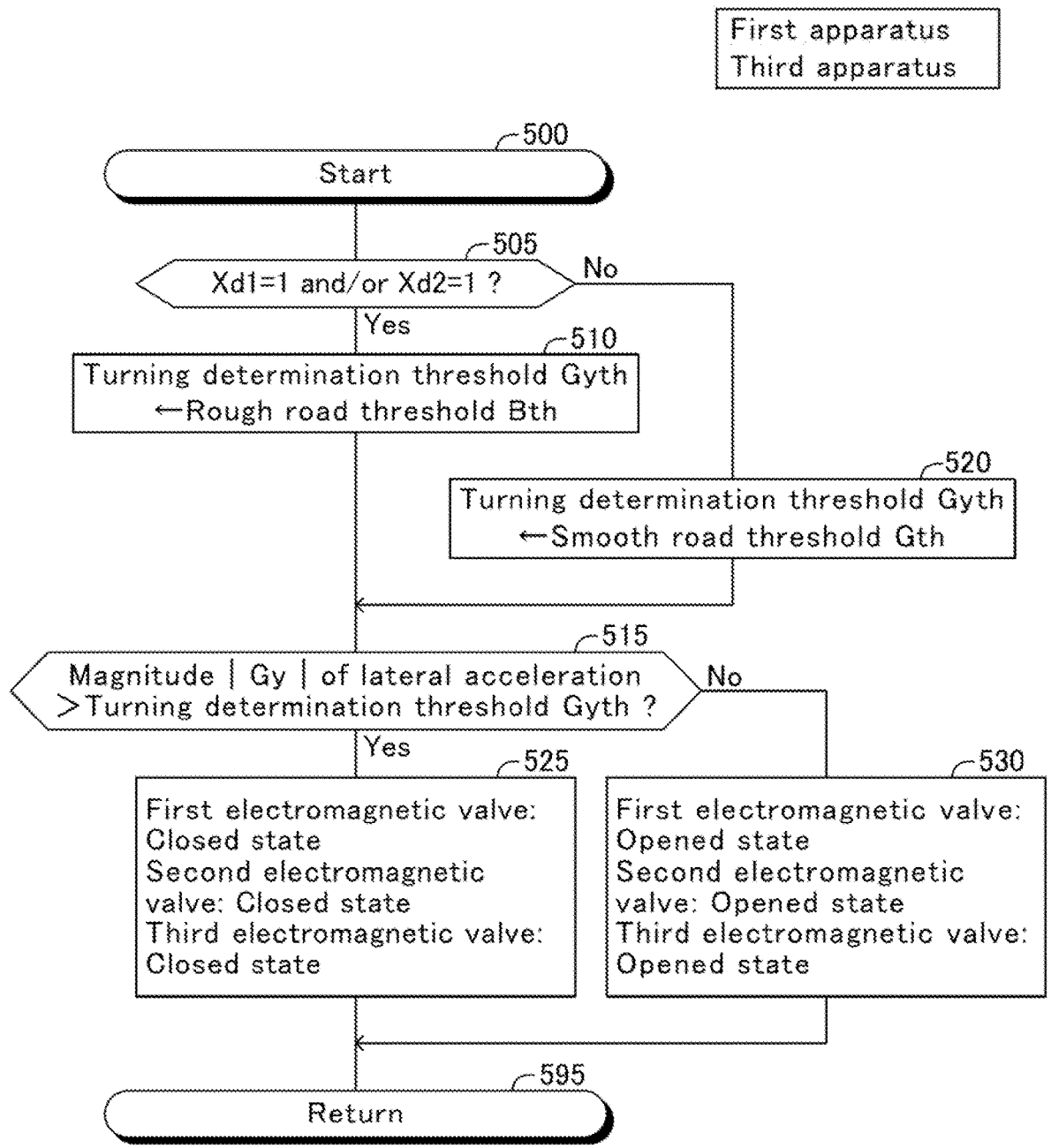
FIG. 5 is a routine shown by a flowchart executed by the CPU of the first apparatus and the CPU of the third apparatus.

Meanwhile, when an appropriate time comes, the CPU starts processing from step 500 shown in FIG. 5, and proceeds to step 505 so as to determine whether or not at least one of the value of the first rough road flag Xd1 and the value of the second rough road flag Xd2 is "1".

When at least one of the value of the first rough road flag Xd1 and the value of the second rough road flag Xd2 is "1" (in other words, when it has been determined that the state of the road surface is the rough road state), the CPU makes a "Yes" determination at step 505 to proceed to step 510 so as to set the turning determination threshold Gyth to the rough road threshold Bth. Thereafter, the CPU proceeds to step 515.

Whereas, when both of the value of the first rough road flag Xd1 and the value of the second rough road flag Xd2 are "0" (in other words, when it has been determined that the state of the road surface is the smooth road state), the CPU makes a "No" determination at step 505 so as to proceed to step 520. At step 520, the CPU sets the turning determination threshold Gyth to the smooth road threshold Gth, and proceeds to step 515. As described above, the smooth road threshold Gth is smaller than the rough road threshold Bth. Thus, it is more easily (or easier) for the CPU to determine that the vehicle 10 is turning when the turning determination threshold Gyth is set to the smooth road threshold Gth than when the turning determination threshold Gyth is set to the rough road threshold Bth.

At step 515, the CPU determines whether or not the magnitude |Gy| of the lateral acceleration Gy is greater than the turning determination threshold Gyth.

When the magnitude |Gy| of the lateral acceleration Gy is greater than the turning determination threshold Gyth, the CPU makes a "Yes" determination at step 515, and executes a process of step 525 described below. Thereafter, the CPU proceeds to step 595 so as to terminate the present routine tentatively.

Step 525: the CPU stops energizing the first electromagnetic valve 25 so as to set the first electromagnetic valve 25 to the closed state, and energizes both of the second electromagnetic valve 45 and the third electromagnetic valve 46 so as to set each of the second electromagnetic valve 45 and the third electromagnetic valve 46 to the closed state. In other words, the CPU sets all of the states of the first electromagnetic valve 25, the second electromagnetic valve 45, and the third electromagnetic valve 46 to the lock states. Consequently, both of the rigidity of the first stabilizer 21 and the rigidity of the second stabilizer 41 are substantially increased, so that they can function/work as the stabilizers.

In contrast, when the magnitude |Gy| of the lateral acceleration Gy is equal to or smaller than the turning determination threshold Gyth, the CPU makes a "No" determination at step 515, and executes a process of step 530 described below. Thereafter, the CPU proceeds to step 595 so as to terminate the present routine tentatively.

Step 530: the CPU energizes the first electromagnetic valve 25 so as to set the first electromagnetic valve 25 to the opened state, and stop energizing both of the second electromagnetic valve 45 and the third electromagnetic valve 46 so as to set each of the second electromagnetic valve 45 and the third electromagnetic valve 46 to the opened state. In other words, the CPU sets all of the states of the first electromagnetic valve 25, the second electromagnetic valve 45, and the third electromagnetic valve 46 to the free states. Consequently, both of the rigidity of the first stabilizer 21 and the rigidity of the second stabilizer 41 are substantially decreased, so that they cannot function/work as the stabilizers.

As has been described above, the first apparatus can decrease a possibility that the ride quality/comfortableness of the vehicle 10 is degraded while the vehicle 10 is running straight on the rough road, and can improve the stability (steering stability/controllability) of the vehicle 10 while the vehicle is running on the smooth road.

Second Embodiment

A stabilizer control apparatus (hereinafter, referred to as a "second apparatus") according to a second embodiment of the present disclosure is different from the first apparatus only in the following points.

The second apparatus makes a road surface determination using only the high frequency component of the wheel acceleration Gw.

The second apparatus classifies the state of the road surface on which the vehicle 10 is running into four stages that include "the smooth road state, a first stage (level) rough road state, a second stage (level) rough road state, a third stage (level) rough road state", through the road surface determination. The degree of roughness of the road surface when the state is the first stage rough road state is higher than when the state is the smooth road state. The degree of roughness of the road surface when the state is the second stage rough road state is higher than when the state is the first stage rough road state. The degree of roughness of the road surface when the state is the third stage rough road state is higher than when the state is the second stage rough road state. Namely, the degree of roughness of the road surface becomes higher as the stage (level) of the rough road state becomes higher.

The second apparatus changes the turning determination threshold Gyth in response to (in accordance with) the classified state of the road surface.

Hereinafter, these different points will be mainly described.

<Specific Operation>

Figure 6:
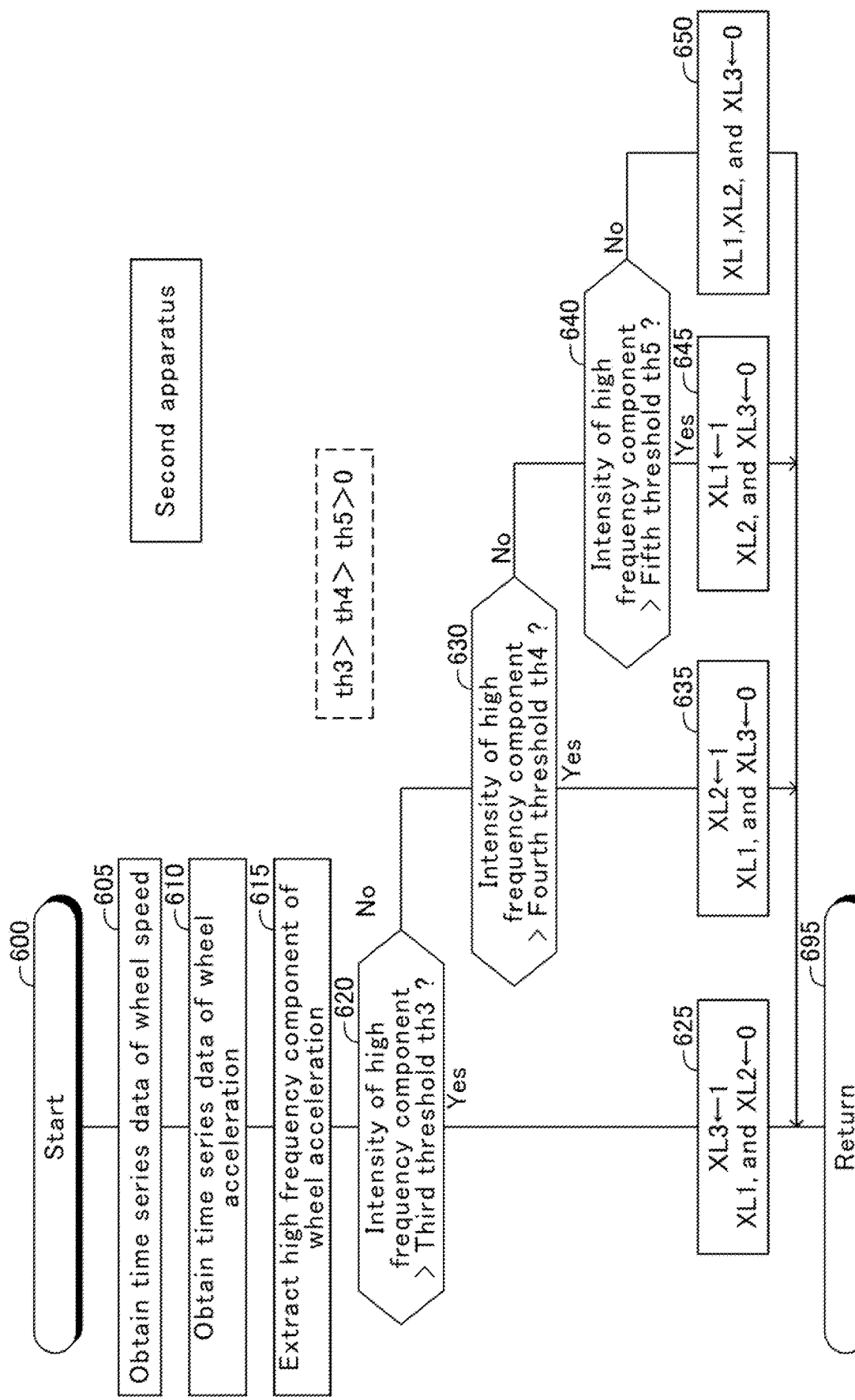
FIG. 6 is a routine shown by a flowchart executed by a CPU of a second embodiment of the stabilizer control apparatus (second apparatus).
Figure 7:
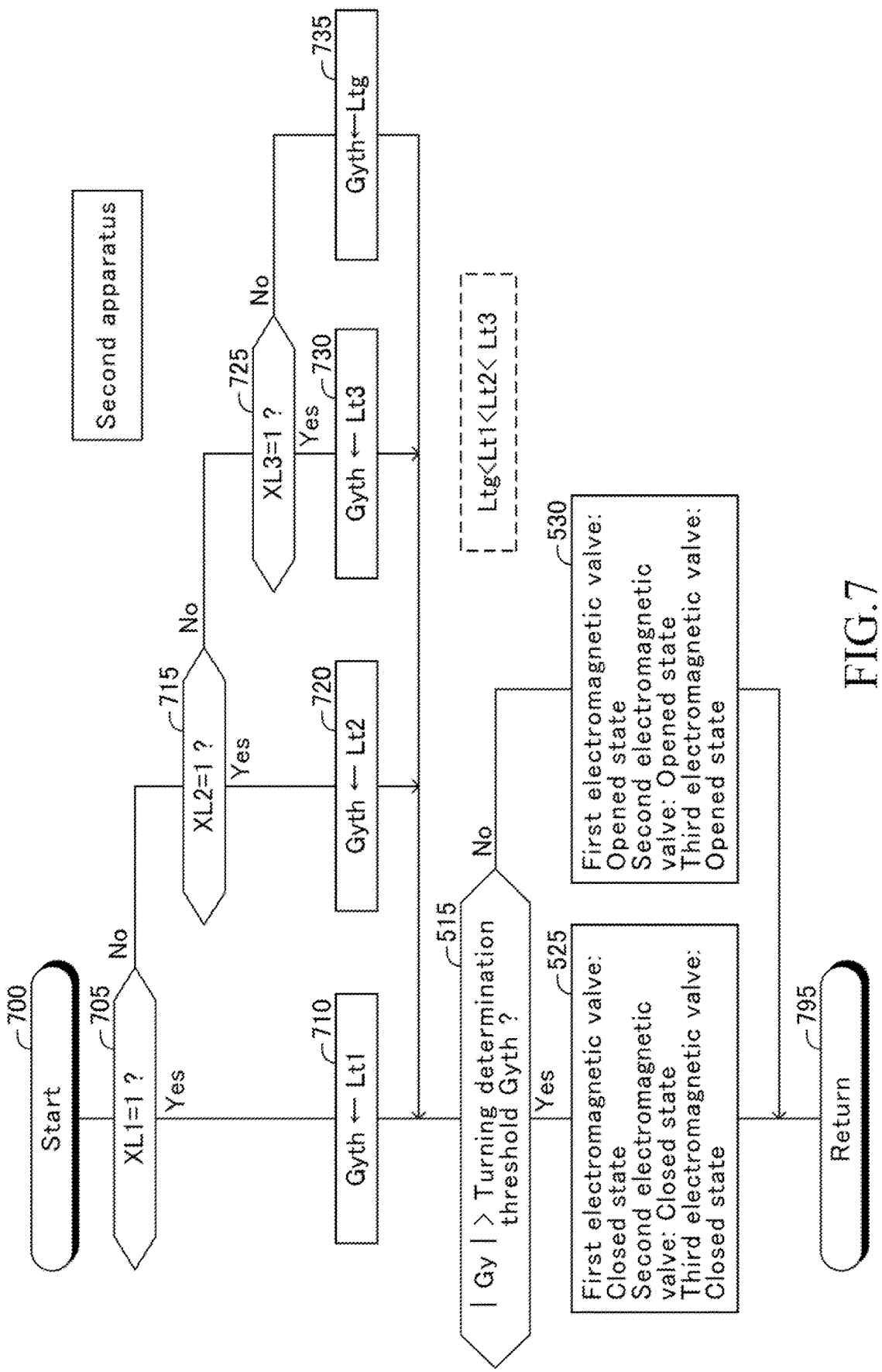
FIG. 7 is a routine shown by a flowchart executed by the CPU of the second apparatus.

The CPU of the second apparatus executes each of routines shown by flowcharts of FIG. 6 to FIG. 7, every time the predetermined time elapses.

Therefore, when an appropriate time comes, the CPU starts processing from step 600 shown in FIG. 6, and executes processes of step 605 to step 615, described below. Thereafter, CPU proceeds to step 620.

Step 605: the CPU obtains the time series data of the wheel speed (front wheel speed) Vw within the predetermined last period, based on the time series data of "the front left wheel speed VFL and the front right wheel speed VFR" within the predetermined last period, similarly to step 305.

Step 610: the CPU obtains the time series data of the wheel acceleration Gw based on the time series data of the wheel speed Vw, similarly to step 310.

Step 615: the CPU performs the fast-Fourier-transform processing and the band pass filtering processing for the time series data of the wheel acceleration Gw so as to extract the high frequency component of the wheel acceleration Gw, similarly to step 315.

When the CPU proceeds to step 620, the CPU determines whether or not the strength/intensity of the high frequency component of the wheel acceleration Gw is greater than a third threshold th3. The third threshold th3 is greater than a fourth threshold th4 described later, and the fourth threshold th4 is greater than a fifth threshold th5 described later (namely, th3>th4>th5>0).

When the strength/intensity of the high frequency component of the wheel acceleration Gw is greater than the third threshold th3, the CPU makes a "Yes" determination at step 620 and proceeds to step 625. At step 625, the CPU sets a value of a third stage rough road flag XL3 to "1", and sets each of a value of a first stage rough road flag XL1 and a value of a second stage rough road flag XL2 to "0". Thereafter, the CPU proceeds to step 695 so as to terminate the present routine tentatively.

The first stage rough road flag XL1 indicates that the state of the road surface is the first stage rough road state when the value of the first stage rough road flag XL1 is "1", and indicates that the state of the road surface is not the first stage rough road state when the value of the first stage rough road flag XL1 is "0".

The second stage rough road flag XL2 indicates that the state of the road surface is the second stage rough road state when the value of the second stage rough road flag XL2 is "1", and indicates that the state of the road surface is not the second stage rough road state when the value of the second stage rough road flag XL2 is "0".

The third stage rough road flag XL3 indicates that the state of the road surface is the third stage rough road state when the value of the third stage rough road flag XL3 is "1", and indicates that the state of the road surface is not the third stage rough road state when the value of the third stage rough road flag XL3 is "0".

Therefore, all of the values of the first stage rough road flag XL1, the second stage rough road flag XL2, and the third stage rough road flag XL3 are "0", the state of the road surface is the smooth road state.

It should be noted that each of the values of the first stage rough road flag XL1, the second stage rough road flag XL2, and the third stage rough road flag XL3 is set to "0" through the initialization routine described above.

Whereas, when the strength/intensity of the high frequency component of the wheel acceleration Gw is equal to or smaller than the third threshold th3, the CPU makes a "No" determination at step 620 and proceeds to step 630. At step 630, the CPU determines whether or not the strength/intensity of the high frequency component of the wheel acceleration Gw is greater than the fourth threshold th4.

When the strength/intensity of the high frequency component of the wheel acceleration Gw is greater than the fourth threshold th4, the CPU makes a "Yes" determination at step 630 and proceeds to step 635. At step 635, the CPU sets the value of the second stage rough road flag XL2 to "1", and sets each of the value of the first stage rough road flag XL1 and the value of the third stage rough road flag XL3 to "0". Thereafter, the CPU proceeds to step 695 so as to terminate the present routine tentatively.

Whereas, when the strength/intensity of the high frequency component of the wheel acceleration Gw is equal to or smaller than the fourth threshold th4, the CPU makes a "No" determination at step 630 and proceeds to step 640. At step 640, the CPU determines whether or not the strength/intensity of the high frequency component of the wheel acceleration Gw is greater than the fifth threshold th5.

When the strength/intensity of the high frequency component of the wheel acceleration Gw is greater than the fifth threshold th5, the CPU makes a "Yes" determination at step 640 and proceeds to step 645. At step 645, the CPU sets the value of the first stage rough road flag XL1 to "1", and sets each of the value of the second stage rough road flag XL2 and the value of the third stage rough road flag XL3 to "0". Thereafter, the CPU proceeds to step 695 so as to terminate the present routine tentatively.

Whereas, when the strength/intensity of the high frequency component of the wheel acceleration Gw is equal to or smaller than the fifth threshold th5, the CPU makes a "No" determination at step 640 and proceeds to step 650. At step 650, the CPU sets all of the values of the first stage rough road flag XL1, the second stage rough road flag XL2, and the third stage rough road flag XL3 to "0". Thereafter, the CPU proceeds to step 695 so as to terminate the present routine tentatively.

Meanwhile, when an appropriate time comes, the CPU starts processing from step 700 shown in FIG. 7, and proceeds to step 705 so as to determine whether or not the value of the first stage rough road flag XL1 is "1".

When the value of the first stage rough road flag XL1 is "1", the CPU makes a "Yes" determination at step 705 to proceed to step 710 so as to set the turning determination threshold Gyth to a first stage rough road threshold Lt1 that is a positive value. Thereafter, the CPU proceeds to step 515 shown in FIG. 7.

Whereas, when the value of the first stage rough road flag XL1 is "0", the CPU makes a "No" determination at step 705 to proceed to step 715 so as to determine whether or not the value of the second stage rough road flag XL2 is "1".

When the value of the second stage rough road flag XL2 is "1", the CPU makes a "Yes" determination at step 715 to proceed to step 720 so as to set the turning determination threshold Gyth to a second stage rough road threshold Lt2 that is greater than the first stage rough road threshold Lt1. Namely, the second apparatus sets the turning determination threshold Gyth to the value that is harder to cause the second apparatus to determine that the vehicle 10 is turning than when the turning determination threshold Gyth is set at the first stage rough road threshold Lt1. Thereafter, the CPU proceeds to step 515 shown in FIG. 7.

Whereas, when the value of the second stage rough road flag XL2 is "0", the CPU makes a "No" determination at step 715 to proceed to step 725 so as to determine whether or not the value of the third stage rough road flag XL3 is "1".

When the value of the third stage rough road flag XL3 is "1", the CPU makes a "Yes" determination at step 725 to proceed to step 730 so as to set the turning determination threshold Gyth to a third stage rough road threshold Lt3 that is greater than the second stage rough road threshold Lt2. Namely, the second apparatus sets the turning determination threshold Gyth to the value that is harder to cause the second apparatus to determine that the vehicle 10 is turning than when the turning determination threshold Gyth is set at the second stage rough road threshold Lt2. Thereafter, the CPU proceeds to step 515 shown in FIG. 7.

Whereas, when the value of the third stage rough road flag XL3 is "0", the CPU makes a "No" determination at step 725 to proceed to step 735 so as to a smooth road threshold Ltg that is smaller than the first stage rough road threshold Lt1. Namely, the second apparatus sets the turning determination threshold Gyth to the value that is easier to cause the second apparatus to determine that the vehicle 10 is turning than when the turning determination threshold Gyth is set at the first stage rough road threshold Lt1. Thereafter, the CPU proceeds to step 515 shown in FIG. 7.

The CPU executes the process of step 515 shown in FIG. 7, as described above, and then one of appropriate processes of step 515 to step 530, as described above. Consequently, when the magnitude |Gy| of the lateral acceleration Gy is greater than the turning determination threshold Gyth (step 515: Yes), both of the rigidity of the first stabilizer 21 and the rigidity of the second stabilizer 41 are substantially increased (step 525), so that they can function/work as the stabilizers. In contrast, when the magnitude |Gy| of the lateral acceleration Gy is equal to or smaller than the turning determination threshold Gyth (step 515: No), each of the rigidity of the first stabilizer 21 and the rigidity of the second stabilizer 41 is substantially decreased (step 530), so that they cannot function/work as the stabilizers. Thereafter, the CPU proceeds to step 795 so as to terminate the present routine tentatively.

As has been described, the second apparatus classifies the state of the road surface into the four stages (the smooth road state, and the first to third stage rough road states), and sets/changes the turning determination threshold Gyth in response to (in accordance with) the classified state of the road surface. By this means, the turning determination threshold Gyth becomes greater (or is set to the value that is more unlikely to cause the second apparatus to determine that the vehicle 10 is turning) as the degree of roughness of the road surface becomes higher. Accordingly, the second apparatus can decrease a possibility that it erroneously determines that the vehicle 10 is turning while the vehicle is actually running straight, and can determine that the vehicle starts turning at an earlier timing as the degree of roughness of the road surface is smaller. Consequently, the second apparatus can realize improving the good ride quality/comfortableness of the vehicle 10 while the vehicle 10 is running on the rough road as well as improving the stability of the vehicle 10 while the vehicle is turning, at a high level.

Third Embodiment

A stabilizer control apparatus (hereinafter, referred to as a "third apparatus") according to a third embodiment of the present disclosure is different from the first apparatus only in the following points.

The third apparatus makes a road surface determination using the vertical acceleration Gz in place of the wheel acceleration Gw.

This difference will be mainly described.

<Specific Operation>

Figure 3:
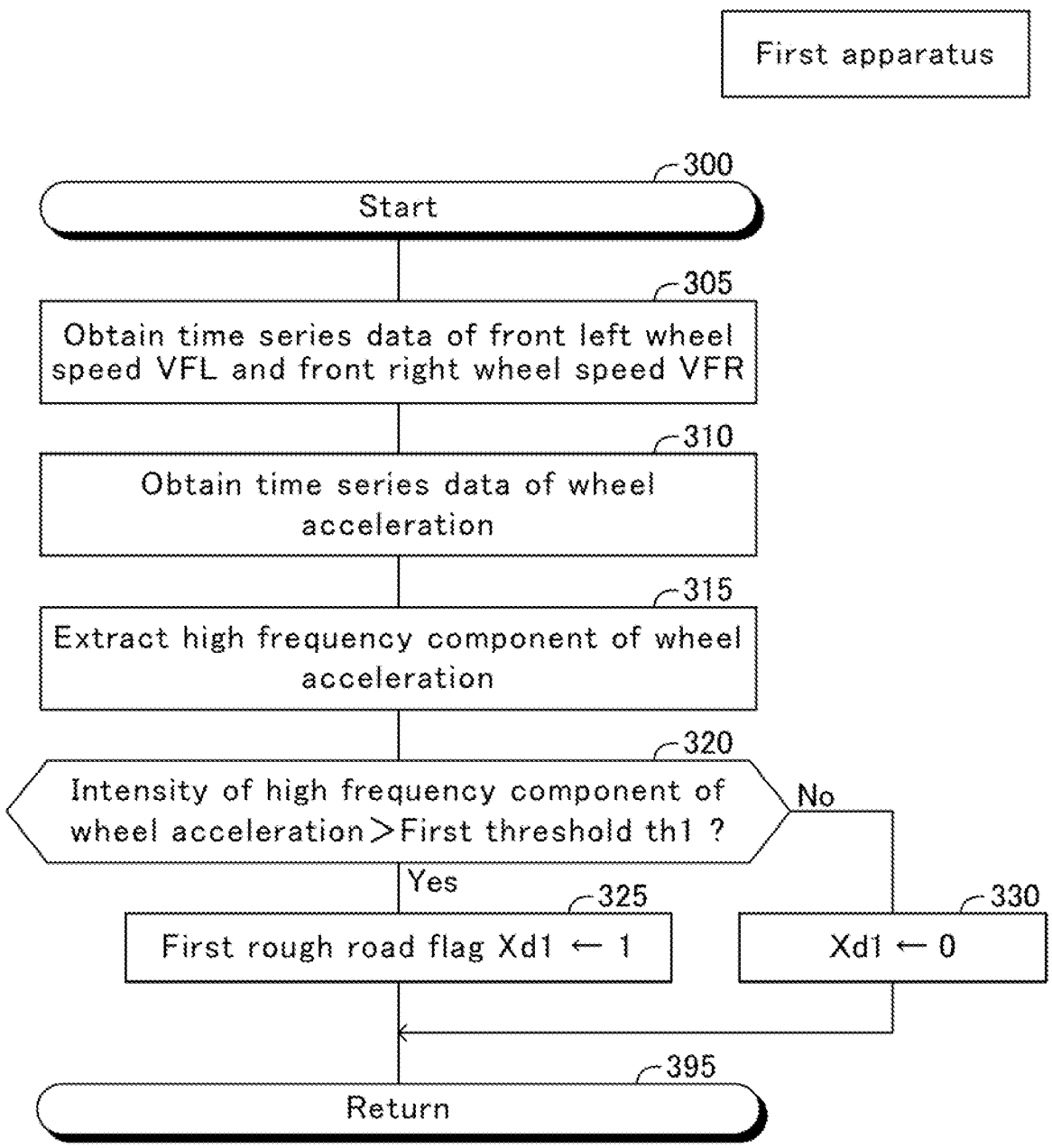
FIG. 3 is a routine shown by a flowchart executed by a CPU of a first embodiment of the stabilizer control apparatus (first apparatus) and a CPU of a third embodiment of the stabilizer control apparatus (third apparatus).
Figure 4:
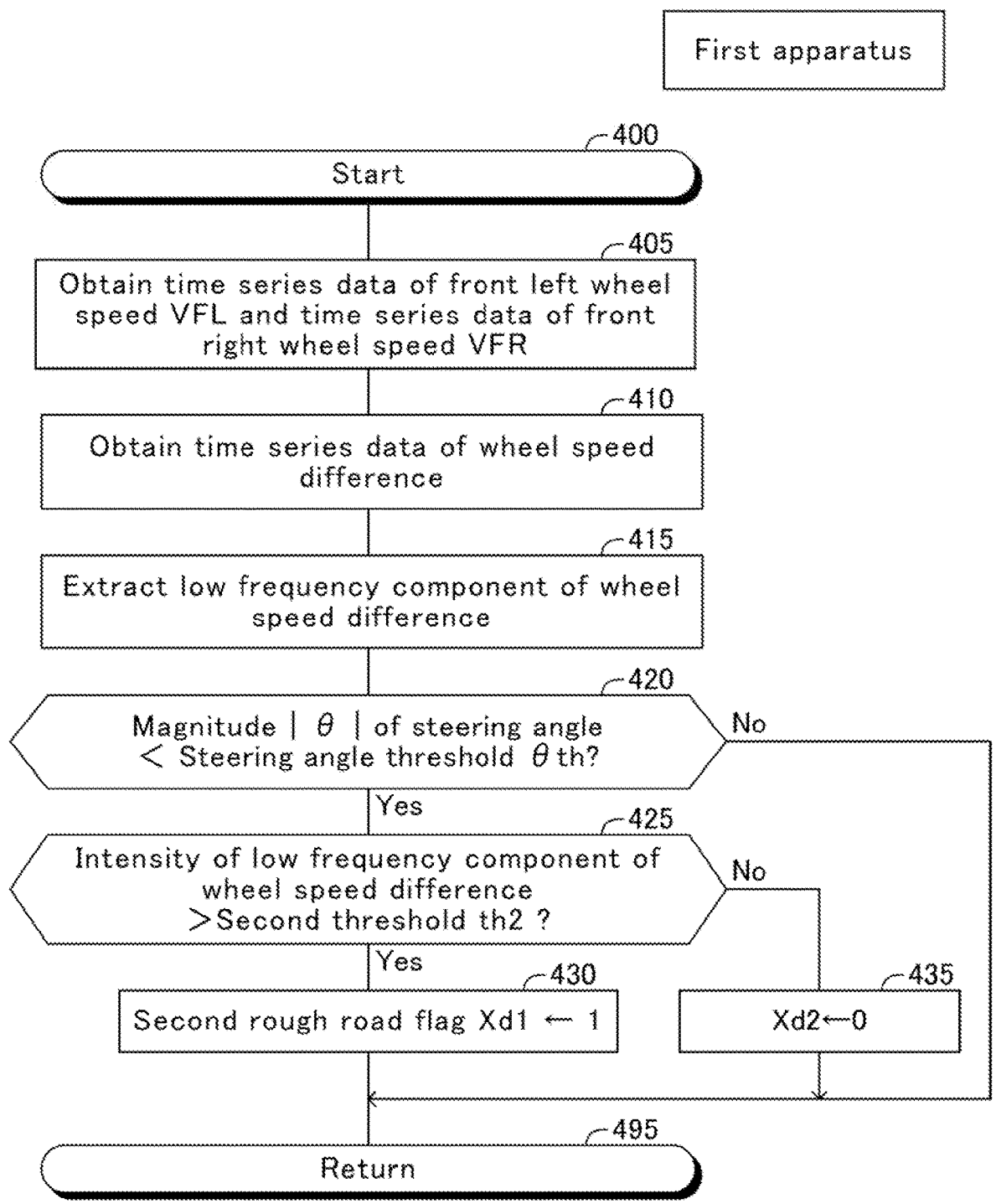
FIG. 4 is a routine shown by a flowchart executed by the CPU of the first apparatus.
Figure 8:
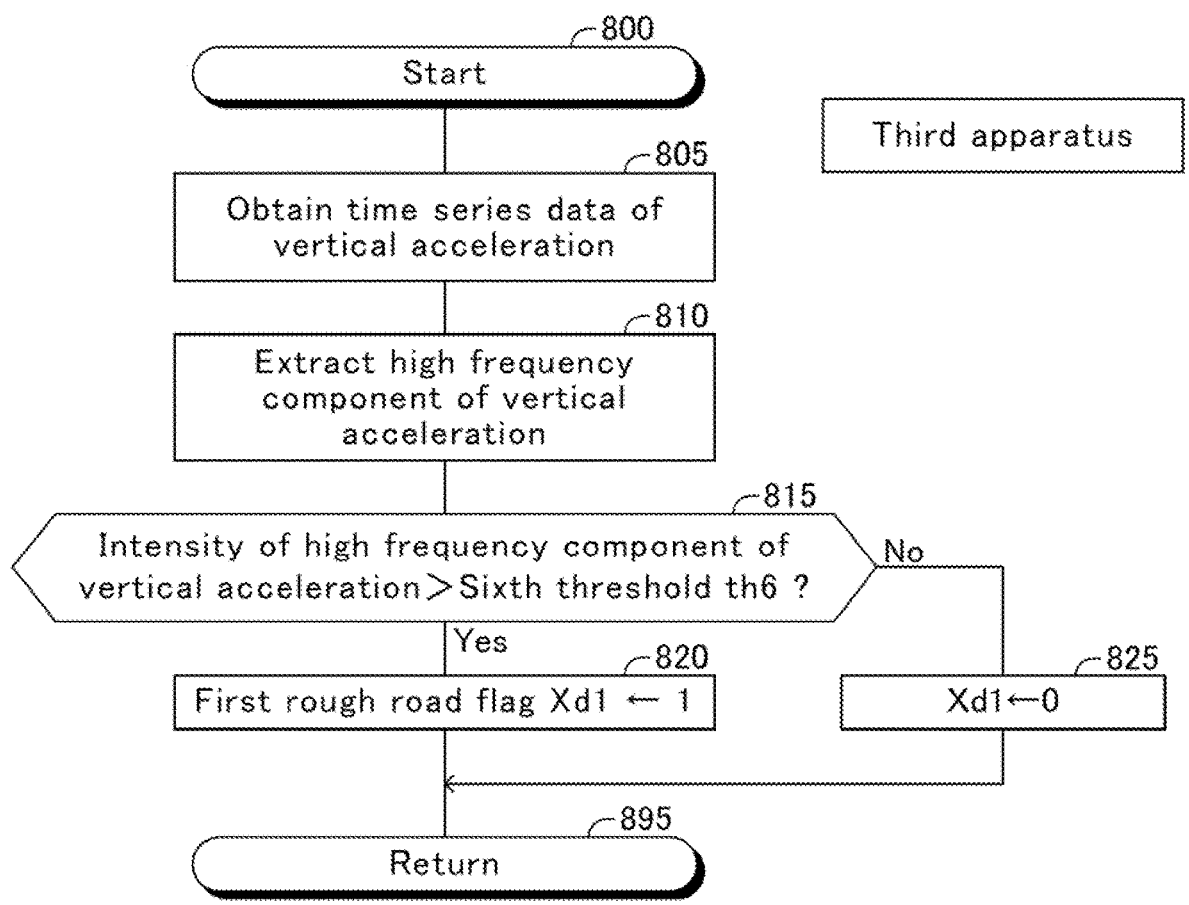
FIG. 8 is a routine shown by a flowchart executed by the CPU of the third apparatus.
Figure 9:
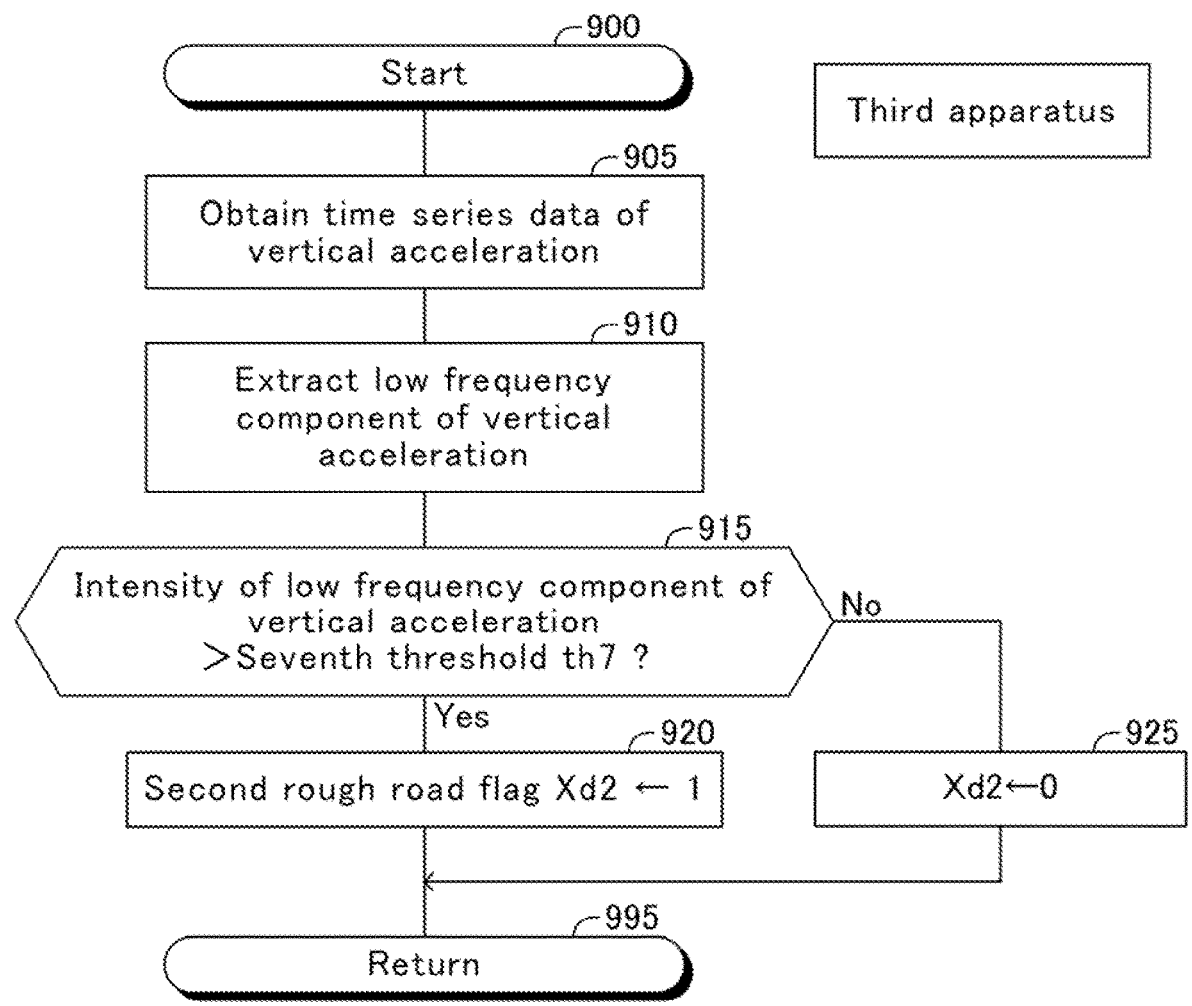
FIG. 9 is a routine shown by a flowchart executed by the CPU of the third apparatus.

The CPU of the third apparatus executes, every time the predetermined time elapses:

a routine shown by a flowchart of FIG. 8 in place of the routine shown by the flowchart of FIG. 3;

a routine shown by a flowchart of FIG. 9 in place of the routine shown by the flowchart of FIG. 4; and the routine shown by the flowchart of FIG. 5.

Therefore, when an appropriate time comes, the CPU starts processing from step 800 shown in FIG. 8, and executes processes of step 805 and step 810, described below. Thereafter, CPU proceeds to step 815.

Step 805: the CPU reads out time series data of the vertical acceleration Gz within the predetermined last period, from the RAM.

Step 810: the CPU performs a fast-Fourier-transform processing and a band pass filtering processing for the time series data of the vertical acceleration Gz so as to extract a high frequency component(s) of the vertical acceleration Gz from the time series data of the vertical acceleration Gz. The high frequency component of the vertical acceleration Gz is a component of the vertical acceleration Gz within a predetermined high frequency band. It should be noted that the predetermined high frequency band is preferably a frequency band within which the resonant frequency (in the vicinity of 10 Hz) of the unsprung mass of the vehicle 10 falls. The strength/intensity of the high frequency component of the vertical acceleration Gz is another "parameter for road surface state determination" or another "first parameter for road surface state determination".

At step 815, the CPU determines whether or not the strength/intensity of the high frequency component of the vertical acceleration Gz is greater than a sixth threshold th6.

When the strength/intensity of the high frequency component of the vertical acceleration Gz is greater than the sixth threshold th6, the CPU makes a "Yes" determination at step 815 and proceeds to step 820 so as to set the value of the first rough road flag Xd1 to "1". Thereafter, the CPU proceeds to step 895 so as to terminate the present routine tentatively.

Whereas, when the strength/intensity of the high frequency component of the vertical acceleration Gz is equal to or smaller than the sixth threshold th6, the CPU makes a "No" determination at step 815, and proceeds to step 825. At step 825, the CPU sets the value of the first rough road flag Xd1 to "0". Thereafter, the CPU proceeds to step 895 so as to terminate the present routine tentatively.

Meanwhile, when an appropriate time comes, the CPU starts processing from step 900 shown in FIG. 9, and executes processes of step 905 to step 910, described below. Thereafter, CPU proceeds to step 915.

Step 905: the CPU reads out the time series data of the vertical acceleration Gz within the predetermined last period, from the RAM, similarly to step 805.

Step 910: the CPU performs a fast-Fourier-transform processing and a band pass filtering processing for the time series data of the vertical acceleration Gz so as to extract a component(s) of the vertical acceleration Gz that falls within a predetermined low frequency band. The extracted component may be referred to as a "low frequency component of the vertical acceleration Gz". The predetermined low frequency band is preferably a frequency band within which the resonant frequency (in the vicinity of 2 Hz) of the sprung mass of the vehicle 10 falls. The strength/intensity of the low frequency component of the vertical acceleration Gz is another "parameter for road surface state determination" or another "second parameter for road surface state determination".

At step 915, the CPU determines whether or not the strength/intensity of the low frequency component of the vertical acceleration Gz is greater than a threshold th7.

When the strength/intensity of the low frequency component of the vertical acceleration Gz is greater than the threshold th7, the CPU makes a "Yes" determination at step 915, and proceeds to step 920. At step 920, the CPU sets the value of the second rough road flag Xd2 to "1". Thereafter, the CPU proceeds to step 995 so as to terminate the present routine tentatively.

Whereas, when the strength/intensity of the low frequency component of the vertical acceleration Gz is equal to or smaller than the threshold th7, the CPU makes a "No" determination at step 915, and proceeds to step 925. At step 925, the CPU sets the value of the second rough road flag Xd2 to "0". Thereafter, the CPU proceeds to step 995 so as to terminate the present routine tentatively.

Similarly to the first apparatus, the thus configured third apparatus can decrease a possibility that the ride quality/comfortableness of the vehicle 10 is degraded while the vehicle 10 is running straight on the rough road, and can improve the stability of the vehicle 10 while the vehicle is running on the smooth road.

The present disclosure is not limited to the above embodiments, but may employ various modifications within the scope of the present disclosure.

For example, the first apparatus may make the road surface determination using only one of the high frequency component of the wheel acceleration Gw and the low frequency component of the wheel speed difference Vwf. In this case, the ECU 50 executes only one of the routine shown in FIG. 3 and the routine shown in FIG. 4. In addition, when the ECU 50 is configured to execute the routine shown in FIG. 3 without executing the routine shown in FIG. 4, the CPU of the ECU 50 determines whether or not the value of the first rough road flag Xd1 is "1" at step 505 shown in FIG. 5. Whereas, when the ECU 50 is configured to execute the routine shown in FIG. 4 without executing the routine shown in FIG. 3, the CPU of the ECU 50 determines whether or not the value of the second rough road flag Xd2 is "1" at step 505 shown in FIG. 5.

The CPU of the ECU 50 of the first apparatus may proceed to step 435 when the CPU makes a "No" determination at step 420. In this configuration, the state of the road surface is deemed to be the smooth road state, when the CPU makes a "No" determination at step 420.

The ECU 50 of the second apparatus is configured to classify the states of the road surface (i.e., the roughness state of the road surface) into the four states including the smooth road state, the first stage rough road state, the second stage rough road state, and the third stage rough road state. However, the ECU may classify the states of the road surface into three states, or five or more states.

The ECU 50 of the second apparatus may be configured to use not only the high frequency component of the wheel acceleration Gw but also the low frequency component of the wheel speed difference Vwf, to make the road surface determination.

The ECU 50 of the second apparatus may be configured to use at least one of the high frequency component of the vertical acceleration Gz and the low frequency component of the vertical acceleration Gz, to make the road surface determination.

The ECU 50 of the third apparatus may be configured to use only one of the high frequency component of the vertical acceleration Gz and the low frequency component of the vertical acceleration Gz, to make the road surface determination. In this case, the ECU 50 executes only one of the routine shown in FIG. 8 and the routine shown in FIG. 9. In addition, when the ECU 50 is configured to execute the routine shown in FIG. 8 without executing the routine shown in FIG. 9, the CPU of the ECU 50 determines whether or not the value of the first rough road flag Xd1 is "1" at step 505 shown in FIG. 5. Whereas, when the ECU 50 is configured to execute the routine shown in FIG. 9 without executing the routine shown in FIG. 8, the CPU of the ECU 50 determines whether or not the value of the second rough road flag Xd2 is "1" at step 505 shown in FIG. 5.

Any of the first apparatus, the second apparatus, and the third apparatus may comprise only one of the variable rigidity device 20 for the front-wheel stabilizer and the variable rigidity device 40 for the rear-wheel stabilizer.

Any of the first apparatus, the second apparatus, and the third apparatus may replace "the suspension apparatus 30 and the variable rigidity device 40 for the rear-wheel stabilizer" with a device equivalent to "the suspension apparatus 12FL, the suspension apparatus 12FR, and the variable rigidity device 20 for the front-wheel stabilizer".

Any of the first apparatus, the second apparatus, and the third apparatus may replace "the suspension apparatus 12FL, the suspension apparatus 12FR, and the variable rigidity device 20 for the front-wheel stabilizer" with a device equivalent to "the suspension apparatus 30 and the variable rigidity device 40 for the rear-wheel stabilizer".

In any of the first apparatus, the second apparatus, and the third apparatus, the configuration of the pipe section 24, and the position and the number of the electromagnetic valves are not limited to the above embodiments. For example, in any of the first apparatus, the second apparatus, and the third apparatus, the pipe section 24 may be configured to comprise an eighth pipe that communicates between the first upper chamber 22up and the second upper chamber 23up, and a ninth pipe that communicates between the first lower chamber 22low and the second lower chamber 23low, omitting the third pipe 24c. In this configuration, an electromagnetic valve is disposed in each of the eighth pipe and the ninth pipe. A flow of the working fluid among the first upper chamber 22up, the first lower chamber 22low, the second upper chamber 23up, and the second lower chamber 23low can be controlled by controlling these electromagnetic valves.

Furthermore, each of the variable rigidity device 20 for the front-wheel stabilizer and the variable rigidity device 40 for the rear-wheel stabilizer is not limited to the above-described one, and may be any type of a variable rigidity device as long as the device can substantially change/vary the rigidity of the corresponding stabilizer. For example, at least one of the variable rigidity device 20 for the front-wheel stabilizer and the variable rigidity device 40 for the rear-wheel stabilizer may comprise an electric actuator that varies the rigidity of the corresponding stabilizer (refer to Japanese Patent Application Laid-Open (kokai) No. 2018-188101, Japanese Patent Application Laid-Open (kokai) No. 2005-88722, and Japanese Patent Application Laid-Open (kokai) No. 2020-59477).

What is claimed is:

1. A stabilizer control apparatus applied to a vehicle having a stabilizer comprising:
   a first sensor generating a first signal that varies depending on a roughness state of a road surface on which said vehicle is running;
   a second sensor generating a second signal that varies depending on a degree of turning of said vehicle;
   a variable rigidity device configured to vary a torsional rigidity of said stabilizer; and
   a control unit configured to:
      obtain a turning determination parameter indicative of a degree of turning of said vehicle based on said second signal;
      compare said turning determination parameter with a turning determination threshold;
      let said variable rigidity device set said torsional rigidity of said stabilizer at a first rigidity, when said turning determination parameter is greater than said turning determination threshold; and
      let said variable rigidity device set said torsional rigidity of said stabilizer at a second rigidity lower than said first rigidity, when said turning determination parameter is equal to or smaller than said turning determination threshold,
   wherein,
   said control unit is configured to:
      obtain a parameter for road surface state determination that varies depending on said roughness state of said road surface based on said first signal; and
      vary said turning determination threshold in such a manner that said turning determination threshold becomes greater as a degree of roughness of said road surface determined based on said parameter for road surface state determination becomes higher,
   wherein,
   said control unit is configured to obtain, as said parameter for road surface state determination, a first parameter for road surface state determination that varies depending on said roughness state of said road surface and a second parameter for road surface state determination that varies depending on said roughness state of said road surface, based on said first signal, and
   wherein,
   said control unit is configured to calculate a high frequency component of a wheel acceleration of a wheel of said vehicle as said first parameter for road surface state determination, and a low frequency component of a wheel speed difference between a left wheel speed and a right wheel speed as said second parameter for road surface state determination.

2. The stabilizer control apparatus according to claim 1, wherein,
said control unit is configured to classify, based on said parameter for road surface state determination, said degree of roughness of said road surface into a first stage and a second stage whose degree of roughness of said road surface is higher than that of said first stage.

3. The stabilizer control apparatus according to claim 1, wherein,
said control unit is configured to classify, based on said parameter for road surface state determination, said degree of roughness of said road surface into three or more stages, each corresponding to a different degree of said roughness state of said road surface.

4. The stabilizer control apparatus according to claim 1, wherein,
said control unit is configured to calculate a high frequency component of a vertical acceleration of a vehicle body of said vehicle as said first parameter for road surface state determination, and a low frequency component of said vertical acceleration of said vehicle body as said second parameter for road surface state determination.

* * * * *